July 14, 1925.  1,546,199
A. M. CAPRA
WATER FILTER
Filed June 9, 1924
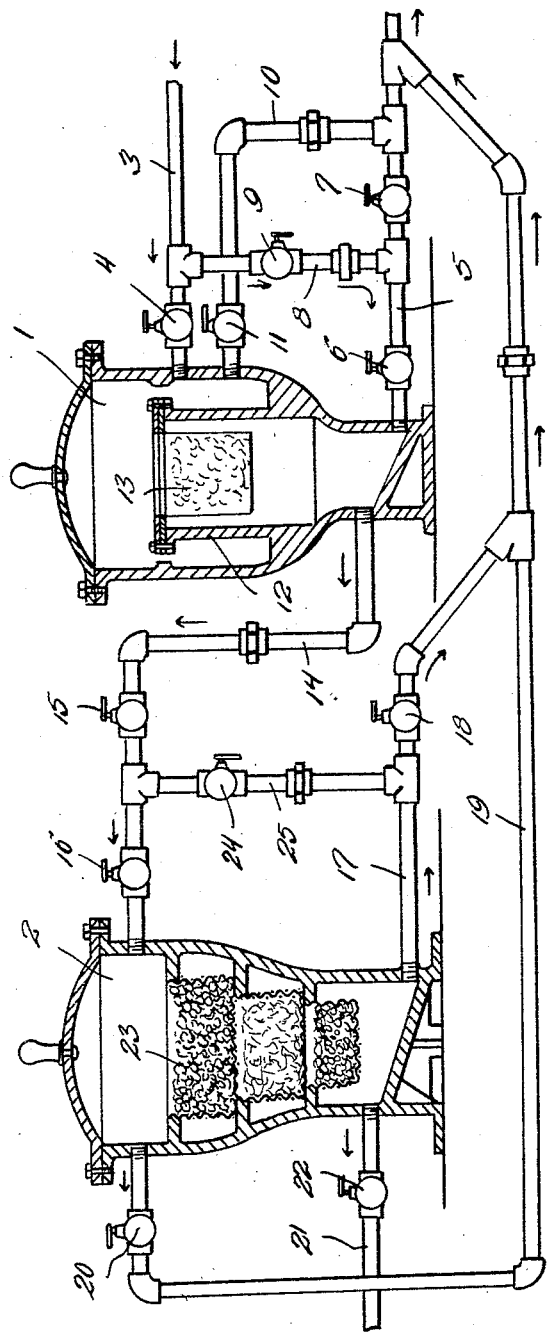
A. M. Capra,
Inventor
By Clarence A. O'Brien
Attorney Patented July 14, 1925.

1,546,199

UNITED STATES PATENT OFFICE.

ANGELO MARIO CAPRA, OF PHILADELPHIA, PENNSYLVANIA, ASSIGNOR TO FEDELE DE PALMA, OF PHILADELPHIA, PENNSYLVANIA.

WATER FILTER.

Application filed June 9, 1924. Serial No. 718,946.

*To all whom it may concern:*

Be it known that I, ANGELO M. CAPRA, a citizen of the United States, residing at Philadelphia, in the county of Philadelphia and State of Pennsylvania, have invented certain new and useful Improvements in a Water Filter, of which the following is a specification.

This invention relates to water filters and it consists in the novel features hereinafter described and claimed.

An object of the invention is to provide a filtering apparatus of the character stated having its parts and features so arranged and assembled that the filtering chambers may be readily cleaned without removing any of the parts or disconnecting the pipes therefrom.

With the above object in view the filter comprises a pair of filtering chambers, one of which is adapted to remove the heavier sediment from water and the other the lighter sediment. The chamber which affects the removal of the heavier sediment will be referred to hereinafter as the primary chamber and the chamber which affects the removal of the lighter sediment from the water will be referred to hereinafter as the secondary chamber. A valve controlled water pipe connects with the primary chamber and also with a waste pipe which is connected with said chamber. The waste pipe is also connected with the secondary chamber. A pipe connects the primary chamber with the secondary chamber and the last mentioned pipe is also connected with the waste pipe. A service pipe is connected with the secondary chamber.

In the accompanying drawing:—

The figure is a side elevation of the water filtering apparatus showing the chambers in vertical section.

The filtering apparatus comprises a primary chamber 1 and a secondary chamber 2. A water supply pipe 3 connects with the side of the primary chamber 1 and is provided with a valve 4. A waste pipe 5 connects with the lower portion of the chamber 1 and is provided with valves 6 and 7. A pipe 8 is connected at one end with the supply pipe 3 and at its other end with the waste pipe 5 at a point between the valves 6 and 7. The pipe 8 is provided with a valve 9. A pipe 10 is connected at one end with the intermediate portion of the chamber 1 and at its other end with the waste pipe 5 at a point beyond the valve 7. The pipe 10 is provided with a valve 11. The chamber 1 is provided with an interiorly located annular flange 12, the upper edge of which is disposed above the ends of the pipes 3 and 10 and the exterior surface of the flange 12 is spaced from the inner surface of the body of the chamber 1 thereby forming a sediment pocket between the said flange and the wall of the chamber. A filtering element 13 is held within the upper portion of the flange 12. A pipe 14 connects the lower portion of the chamber 1 with the upper portion of the chamber 2 and is provided with spaced valves 15 and 16. A pipe 17 is connected with the lower portion of the chamber 2 and is provided with a valve 18. A pipe 19 is connected at one end with the upper portion of the chamber 2 and is provided with a valve 20. The lower end of the pipe 17 connects with the pipe 19 at a point between the ends thereof and the lower end of the pipe 19 connects with the pipe 5 hereinbefore described. A service pipe 21 is connected with the lower portion of the chamber 2 and is provided with a valve 22. Filtering elements 23 are housed within the chamber 2 between the pipes 14 and 21. During the filtering operation, the valves 6 and 11 are closed and the valve 4 is open whereby water may enter the chamber 1 from the pipe 3. The water flows over the upper edge of the flange 12 in the chamber 1 and the heavier sediment settles into the lower portion of the pocket between the flange 12 and the side wall of the chamber 1. As the water passes through the filtering element 13, some of the finer particles of sediment are removed from the water and retained within the elements 13. When it is desired to remove the sediment from the pockets from between the flange 12 and the wall of the chamber 1, the valve 11 is open and the water flows from the chamber 1 through the pipe 10 into the waste pipe 5 carrying with it the sediment which has been accumulated in the pocket between the flange and the wall of the chamber 1. When it is desired to remove the sediment from the lower portion of the chamber 1, the valves 6 and 7 upon the pipe 5 are open, the valve 9 is closed and the water passes from the chamber 1 through the pipe 5 carrying with it the sediment which has been accumulated in the lower portion of the said chamber.

When it is desired to pass the water from the chamber 1 to the chamber 2, the valve 4 is opened, and the valves 11, 6 and 7 are closed. The valves 15 and 16 in the pipe 14 are opened and consequently the water may flow from the lower portion of the chamber 1 through the pipe 14 into the upper portion of the chamber 2. The valve 22 in the pipe 21 is opened and the water passes down through the filtering element 23 and the smaller particles of sediment are removed from the water and retained in the said elements and the clear water flows out of the chamber 2 through the pipe 21. Should it be desired to flush the lower portion of the chamber 1 with water from the pipe 3 and without passing the water through the upper portion of the said chamber. The valve 16 in the pipe 14 is closed. The valve 15 is open, the valve 24 in the pipe 25 is open, the valve 18 is open and consequently water may pass from the lower portion of the chamber 1 through the pipe 14 to the pipe 25 and through the said pipe 25 to the pipe 17 thence through the pipe 19 to the pipe 5. The valves 6 and 9 in the pipes 5 and 8 respectively are opened and water may flow from the pipe 3 through the pipes 8 and 5 into the lower portion of the chamber 1.

When the valve 24 is closed and the valves 15 and 16 in the pipe 14 are open and the water is being filtered in the chamber 1, the water may flow through the pipe 14 into the upper portion of the chamber 2 and circulate through the filtering element 23 and pass out of the chamber 2 through the pipe 21 in the manner hereinbefore described. When it is desired to clean the filtering element 23 in the chamber 1, the valve 16 is closed and the valve 24 is opened. The valve 22 is closed and the valve 20 in the pipe 19 is open. Thus the water may flow from the pipe 14 through the pipes 25 and 17 into the lower portion of the chamber 2 and pass up through the filtering element 23 removing the sediment therefrom and carrying the same out through the pipe 19 and into the waste pipe 5 as hereinbefore described.

Having thus described the invention, what I claim is:—

1. A filtering apparatus comprising a primary chamber and a secondary chamber, a pipe connecting the lower portion of the primary chamber with the upper portion of the secondary chamber and having spaced valves, a waste pipe connected with the lower portion of the primary chamber and having spaced valves, a pipe connected with the lower portion of the secondary chamber and having a valve and connected with the said waste pipe, a valved pipe connected with the pipe which connects the chambers together and having a valve and connected at its bottom with the pipe which connects with the lower portion of the secondary chamber, a pipe connected with the upper portion of the secondary chamber and connected with the waste pipe and having a valve, a valve controlled service pipe connected with the lower portion of the secondary chamber, filtering elements located within the secondary chamber, a supply pipe connected with the primary chamber, a filtering element located in the primary chamber, a pipe connected with the intermediate portion of the primary chamber and with the waste pipe and having a valve, and a pipe connected with the service pipe and the waste pipe at a point between the valves of the waste pipe, the last mentioned pipe having a valve.

2. A filter comprising a chamber body having an interiorly located flange spaced between its ends, the exterior wall of the flange being spaced from the side walls of the chamber, a filtering element held within the flange, a supply pipe connected with the side of said chamber at a point below the flange, waste pipes connected with said chamber, one at a point between the upper and lower ends of the flange and the other at a point below the upper edge of said flange, said waste pipes being connected together, a valve controlled pipe connected with the supply pipe and the lower waste pipe and an exit pipe connected with the lower portion of the chamber.

3. A filtering apparatus of the class described comprising a primary chamber, a filter means supported in said chamber at a point between the ends thereof, a valved water supply pipe connected with said chamber, a waste pipe connected with the lower portion of the chamber and provided with spaced valves, a valved by-pass between said supply and waste pipes, said by-pass being connected with the waste pipe at a point between the spaced valves in the latter, a pipe leading from the lower portion of said primary chamber, a secondary chamber to the upper portion of which said last named pipe is connected, said last named pipe being provided with spaced valves, a valved waste pipe connected with the lower portion of the secondary chamber, a second valved by-pass connected with the last named waste pipe and with the connector pipe between said chambers.

In testimony whereof I affix my signature.

ANGELO MARIO CAPRA.